UNITED STATES PATENT OFFICE.

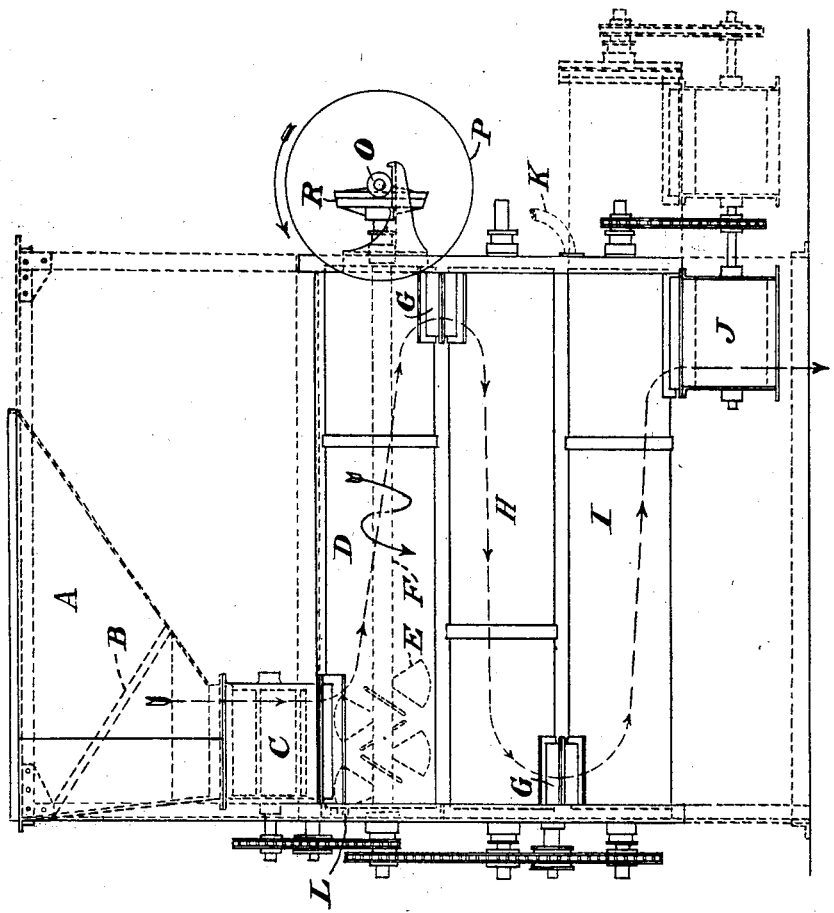

JAMES WILLIAM CLAUDE HAMILTON AND EDWARD WILLIAM QUIRK, OF LIVERPOOL, ENGLAND.

STERILIZING CEREALS, NUTS, SEEDS, AND THE LIKE.

1,381,300. Specification of Letters Patent. Patented June 14, 1921.

Application filed August 6, 1918. Serial No. 248,574.

*To all whom it may concern:*

Be it known that we, JAMES WILLIAM CLAUDE HAMILTON and EDWARD WILLIAM QUIRK, subjects of the King of Great Britain, residing at Liverpool, in the county of Lancaster and Kingdom of England, have invented certain new and useful Improvements in Sterilizing Cereals, Nuts, Seeds, and the like, of which the following is a specification.

This invention has for its object a process for sterilizing cereals and other seeds, nuts, and the like, and the invention consists essentially in placing the goods in any closed container, and passing through them formaldehyde and/or polymer (paraformaldehyde) $CH_2O_{(3)}$ or a mixture of these heated to such a degree as to be gaseous. It has often been proposed to sterilize materials by means of formaldehyde but it has hitherto not been known that weevils can be satisfactorily gotten rid of by this process, and it requires a very considerable exposure to formaldehyde gases, first, to make the weevils uncomfortable and then come out of their holes in the grain or other material, and, secondly, to stupefy them. We therefore use machinery in which the grains, nuts, or the like, are turned over continuously while exposed to the gases traveling in the reverse direction. Thus, in approximately one third of the traverse of the material the weevils are so affected or made uncomfortable that they come out of the material being treated, while in the next part of the traverse they are rendered insensible, and with the continuation of the operation they are dried up and killed, and being already clear of the material, they are easily separated therefrom.

The annexed drawing sets forth a sectional view of the apparatus, which we are using, though at the same time we do not in the slightest confine ourselves to this apparatus, as almost any apparatus in which the seeds are thoroughly and equally exposed to the gas can be utilized, such for instance as a single long Archimedean screw or worm with the seed passing in at one end, and out at the other under suitable heads, and between these two points at a considerable distance apart an entrance for the gas and an exit for the gaseous residue, the gas going in an opposite direction to the seed.

Referring to the drawings, A is a hopper containing a grid B. This grid sieves out any large impurities that may happen to be among the grain. C is a feeding device for feeding the grain to the Archimedean mixer D. This has a series of blades E fixed on the shaft F. G and G are valves which can be closed when required, and H and I two further cylinders with Archimedean blades. The Archimedean screw I feeds into the air lock J where the material is drawn off in any desired manner. The gas enters at K and exits through an outlet and relief valve at L.

The seeds are passed through at approximately a speed of half a ton a minute. The driving wheel P makes 220 revolutions a minute, and the bevel wheels O and R are respectively 13 inches and 44 inches in diameter. The gas passing in at K through a one and three quarter inch bore is at 2 lbs. per square inch pressure, and escapes at L through a relief valve. These are the quantities in our experimental machine which appear to be satisfactory. The seeds in any case must be thoroughly exposed to the gases and should remain in contact with them for about a minute, but if the seeds be in thin layers or vigorously agitated with the gas a somewhat less time may suffice. Both the seed entrance and the seed exits are so arranged as to have a tolerably heavy head of seed over them so that little or no gases can escape except through the relief valve.

We declare that what we claim is:—

1. A process of sterilizing seeds nuts and the like which consists in passing them through a mixture of air and formaldehyde in which the latter is nearly exhausted, then passing them on through a stronger and stronger charge of formaldehyde in air, and finally to the fresh unexhausted charge whereby the weevils are first made uncomfortable and come out of their holes in the seed then they are stupefied and finally killed.

2. The process of sterilizing seeds, nuts and the like, which consists in passing the seeds in one direction through a long narrow space, while formaldehyde gases are passed through the mass of seeds in the reverse direction, the seeds being fed into the space and extracted from it in an air-lock manner.

3. The process of sterilizing seeds, nuts and the like, so as to eliminate the weevils, which consists in passing the seeds through a long space in which they are thoroughly stirred and inverted, and which is filled with weak formaldehyde gases, then passing the seeds through a stronger formaldehyde mixture, while similarly stirred and inverted, and lastly passing them through a strong mixture of formaldehyde sufficient to kill the weevils.

In witness whereof, we have hereunto signed our names this 19th day of July 1918, in the presence of two subscribing witnesses.

JAMES WILLIAM CLAUDE HAMILTON.
EDWARD WILLIAM QUIRK.

Witnesses:
H. P. SHOWBRIDGE,
J. MCCORMICK.